No. 791,631.

Patented June 6, 1905.

UNITED STATES PATENT OFFICE.

HUGO LIEBER, OF NEW YORK, N. Y.

LUMINOUS PAINT.

SPECIFICATION forming part of Letters Patent No. 791,631, dated June 6, 1905.

Application filed May 24, 1904. Serial No. 209,466.

*To all whom it may concern:*

Be it known that I, HUGO LIEBER, a citizen of the United States, and a resident of New York, county and State of New York, have invented new and useful Improvements in Luminous Paints, of which the following is a specification.

The subject of this invention is luminous paint.

The preferred form of composition is self-luminous, but fireproof and tenacious. One form contains a composition of zinc sulfid and radium-barium carbonate mixed with a body formed of soluble cotton and wood-alcohol, acetone, and castor-oil. These are preferably mixed in the following manner: First, about six parts of alcohol are mixed with two parts of acetone. Then the soluble cotton is dissolved in the fluid in proportion of about one pound of cotton to three gallons of the fluid. Next about a pint of oil is mixed with one gallon of the prepared mixture. This completes the body. Then the sulfid is mixed in in the proportion of one ounce to six ounces of the prepared body. The radium compound is preferably added to the luminescent material before mixing with the body. The resultant composition dries very quickly, is highly luminous, non-inflammable, and tenacious. It, in fact, acts as a fireproofing to any surface to which it may be applied and yet is highly luminous. The alcohol and the soluble cotton form a durable and adhesive body. The acetone assists the alcohol in solution and increases the flexibility of the applied composition. The oil greatly increases the smoothness and dries quickly. The zinc sulfid is highly luminescent and with the acetone entirely counteracts the inflammability of the cotton. The radium compound increases and maintains the luminosity of the composition by exciting the sulfid. Amyl acetate may be substituted for the acetone in the body. The resultant body is transparent and gives superior results in color and luminosity.

It will be obvious to those skilled in the art that other solvents for the body, other oils, other luminescent substances, and other radio-active excitants might be substituted without departing from my invention.

What I claim is—

1. A luminous and fireproof paint comprising the combination of an adhesive body, a quick-drying fluid, a radio-active excitant and a luminescent substance neutralizing the combustible properties of the body.

2. A paint composition composed of zinc sulfid, radium-barium carbonate and a quick-drying adhesive and tenacious body.

3. A paint composition containing a luminescent compound, a radio-active excitant and an adhesive and quick-drying carrier therefor.

HUGO LIEBER.

Witnesses:
L. W. MACDONALD,
JOHN J. FARBRIDGE.